(12) United States Patent
Smith et al.

(10) Patent No.: US 6,307,612 B1
(45) Date of Patent: Oct. 23, 2001

(54) LIQUID CRYSTAL DISPLAY ELEMENT HAVING A PRECISELY CONTROLLED CELL GAP AND METHOD OF MAKING SAME

(75) Inventors: Peter A. Smith, Chandler; Henning C. Stauss, Phoenix; Barnaby Tack; James Thomson, both of Gilbert, all of AZ (US)

(73) Assignee: Three-Five Systems, Inc., Tempe, AZ (US)

( * ) Notice: Subject to any disclaimer, the term of this patent is extended or adjusted under 35 U.S.C. 154(b) by 0 days.

(21) Appl. No.: 09/589,952

(22) Filed: Jun. 8, 2000

(51) Int. Cl.[7] .............................. G02F 1/1339; G02F 1/13
(52) U.S. Cl. .................... 349/157; 349/155; 349/187
(58) Field of Search ................................. 349/155, 157, 349/187

(56) References Cited

U.S. PATENT DOCUMENTS

| | | | |
|---|---|---|---|
| 3,852,092 | * 12/1974 | Patterson et al. | 349/155 |
| 4,626,073 | 12/1986 | Amstutz et al. | 350/344 |
| 4,653,864 | 3/1987 | Baron et al. | 350/344 |
| 4,678,284 | 7/1987 | Tashiro | 350/344 |
| 4,989,955 | * 2/1991 | Ito et al. | 349/157 |
| 5,130,831 | 7/1992 | Kohara et al. | 359/81 |
| 5,142,395 | 8/1992 | Yamazaki et al. | 359/81 |
| 5,210,629 | 5/1993 | Kim | 359/81 |
| 5,812,232 | * 9/1998 | Shiroto et al. | 349/157 |
| 6,184,956 | * 2/2001 | Kang et al. | 349/113 |

* cited by examiner

*Primary Examiner*—William L. Sikes
*Assistant Examiner*—Tarifur Chowdhury
(74) *Attorney, Agent, or Firm*—Gallagher & Kennedy, P.A.; John D. Titus

(57) ABSTRACT

A liquid crystal display cell having improved cell gap uniformity is made by depositing a plurality of spacer particles on the cell substrate then subjecting the substrate to an external energy source to selectively dislodge and remove the larger particles, such as by immersing the substrate in and ultrasonic bath. Because the larger particles will inherently have a lesser attraction to the substrate relative to their mass, subjecting the entire substrate to the ultrasonic bath will inherently preferentially remove the larger particles, resulting in a distribution having a smaller standard deviation than the initial mixture of particles deposited on the substrate as well as an asymmetric reduction in the number of gap-dominating large particles.

20 Claims, 2 Drawing Sheets

LIQUID CRYSTAL DISPLAY ELEMENT HAVING A PRECISELY CONTROLLED CELL GAP AND METHOD OF MAKING SAME

BACKGROUND OF THE INVENTION

The present invention relates to liquid crystal display elements and more particularly to a method of making liquid crystal display elements having a precisely controlled, uniform cell gap.

Use of liquid crystal display (LCD) elements has begun to emerge as the method of choice for displaying large amounts of graphical information in displays such as computers and video displays in addition to the use of LCD's in their traditional role as a display unit for devices requiring limited display of information such as in watches, cellular telephones and the like. Traditionally, liquid crystal display elements have been manufactured by printing an array of electrodes on a first substrate, printing a corresponding transparent electrode or electrodes on a second, glass substrate, and injecting a liquid crystal material between the two substrates. The separation between the two substrates, which essentially determines the thickness of the liquid crystal layer, should be held as constant as possible over the entire area of the cell. Traditionally, the cell gap is maintained through the introduction of spacers between the substrates. Typically, the spacers comprise tiny particles such as glass or plastic beads, glass fibers, or carbon fibers. The particles may be dusted onto the substrate by exposing the substrate to an atmosphere containing a particular concentration of the particles, or may be spun onto the substrate by depositing on the substrate a solvent carrying a particular concentration of the particles and centrifuging the substrate to distribute the particles and evaporate the solvent. With either of these methods of application, a combination of electrostatic and steric forces, primarily electrostatic forces, cause the particles to adhere to the substrate.

For optimum performance, the cell gap should be maintained at the optimum distance with no tolerance. Unfortunately, it is not commercially practicable to manufacture liquid crystal display elements with zero tolerance on the cell gap. Commercially available spacers having a particular nominal size will, of course, in reality constitute a distribution of particles having a mean particle size and particles that are larger and smaller than the mean particle size. Since, as the substrates are brought together, the largest particles in the distribution will contact the substrates first, it is the size of the largest particles that primarily determines the cell gap. Moreover, since the substrates are usually flexible, at least where the cell gap is on the scale of the 0.4 to 10 microns and the ratio of cell span to cell gap is very large, as is required for high performance microdisplays, the distribution of particle sizes within the display element will allow the cell gap to vary across the display element allowing an inhomogeneous thickness of the liquid crystal layer. The inhomogeneous thickness results in optical path length differences (the product of the birefringence of the liquid crystal and the cell gap) across the display, resulting in a deleterious effect on the contrast ratio and the chromatic fidelity of the display.

New and improved liquid crystal materials and high performance substrates are being developed for high-speed, low operating voltage displays. Substrate spacings of less then five microns will be required for these new and improved displays. As the mean value of the cell gap is further and further reduced, the sensitivity of these devices to variation in cell gap becomes more and more critical.

Various methods have been suggested for improving cell gap uniformity. U.S. Pat. No. 5,210,629 discloses a method of filtering the glass spacers to improve spacer uniformity. U.S. Pat. No. 4,653,864 discloses a method of forming polyimide spacers on a substrate using conventional photolithographic techniques. U.S. Pat. No. 4,626,073 discloses use of elastic spacers in lieu of conventional rigid glass or polymer spacers. What is needed, however, is a method of improving cell gap uniformity without the added expense of additional photolithographic process steps or cumbersome filtration techniques.

SUMMARY OF THE INVENTION

According to the present invention, a liquid crystal display cell having improved cell gap uniformity is made by depositing, either by dusting, spinning, or by other conventional techniques, a plurality of spacer particles on the cell substrate then subjecting the substrate to an external energy source to selectively dislodge and remove the larger particles. According to a preferred embodiment of the invention, the substrate is immersed in an ultrasonic bath and subjected to ultrasonic energy. Since the larger particles will inherently have a lesser attraction to the substrate relative to their mass, subjecting the entire substrate to the ultrasonic bath will inherently preferentially remove the larger particles, resulting in a distribution having a smaller standard deviation than the initial mixture of particles deposited on the substrate and an asymmetric shift in the distribution of particles above and below the nominal particle size (mode) with the standard deviation above the nominal particle size being less than the standard deviation below the nominal particle size.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
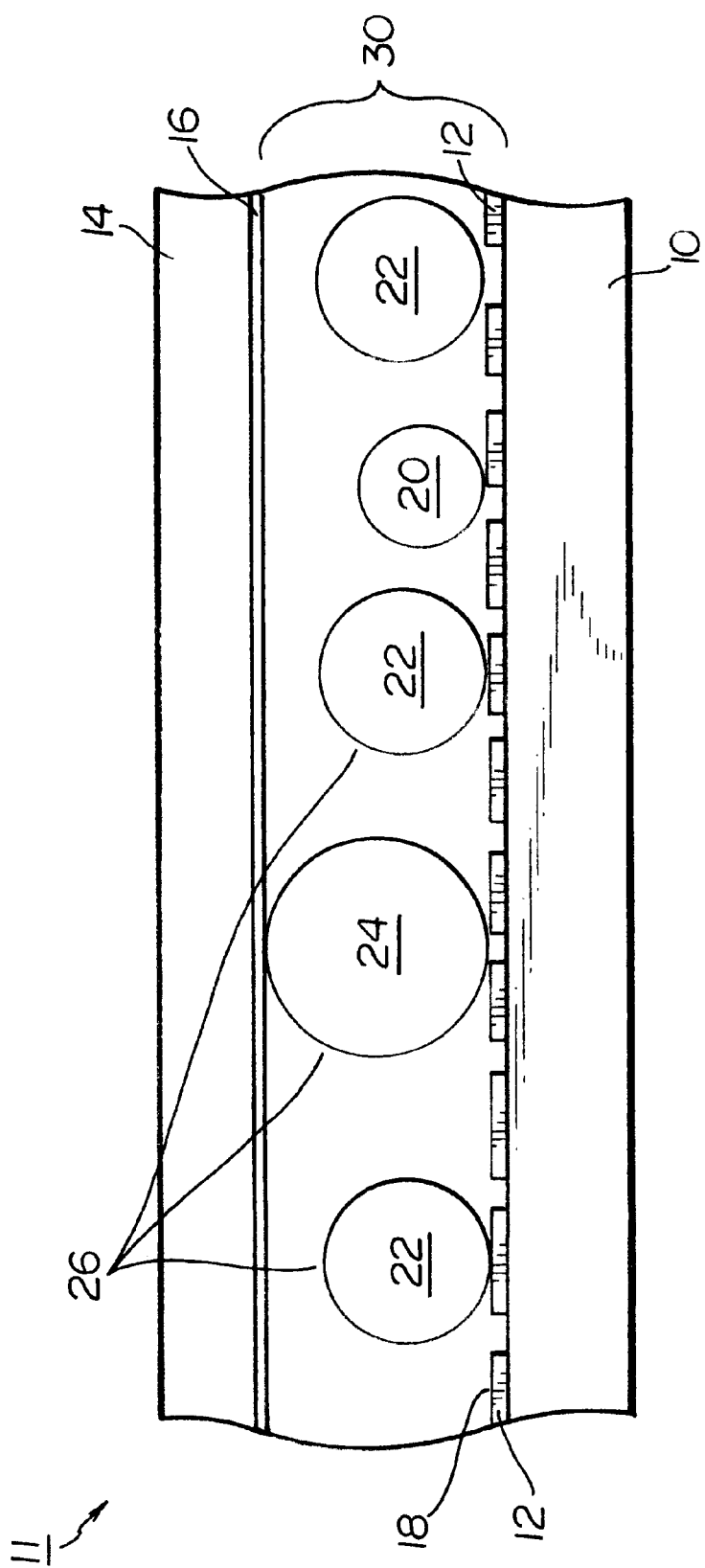
FIG. 1 is a cross-sectional view of a liquid crystal display cell having non-uniform spacer members.

The drawing figures are intended to illustrate the methods disclosed herein and are not necessarily to scale. In the description and in the claims the terms left, right, front and the back and the like are used for descriptive purposes. However, it is understood that the embodiment of the invention described herein is capable of operation in other orientations than is shown and the terms so used are only for the purpose of describing relative positions and are interchangeable under appropriate circumstances.

With reference to FIG. 1, a typical pixillated liquid crystal display element, be it a conventional active matrix liquid crystal display (AMLCD) or a liquid crystal on silicon (LCOS) display comprises a substrate 10 on which is printed a plurality of pixel electrodes 12. A thin-film transistor (TFT) in the case of an AMLCD or a conventional transistor in the case of an LCOS display serving as a switching element is formed near each pixel electrode 12 with the source electrodes (not shown) connected to each of the pixel electrodes 12. A transparent substrate 14 having disposed thereon a common electrode 16 made of a transparent material such as indium tin oxide (ITO) is bonded to substrate 10 along a common periphery with a quantity of spacer members 26 comprising particles such as particles 20, 22, 24 sandwiched between substrates 14 and 10 to maintain a uniform gap therebetween. Typically, particles 20, 22 and 24 are deposited on substrate 10 in the form of a powder that is dusted onto substrate 10 by exposing substrate 10 to an atmosphere containing the particles 20, 22 and 24 propelled from a nozzle. As the particles 20, 22 and 24 impinge the upper surface 18 of substrate 10, electrostatic attraction between the particles and the substrate attract and retain the particles against substrate 10. Additionally, a weaker steric attraction also tends to attract and bond the particles 20, 22 and 24 against substrate 10.

Figure 2:
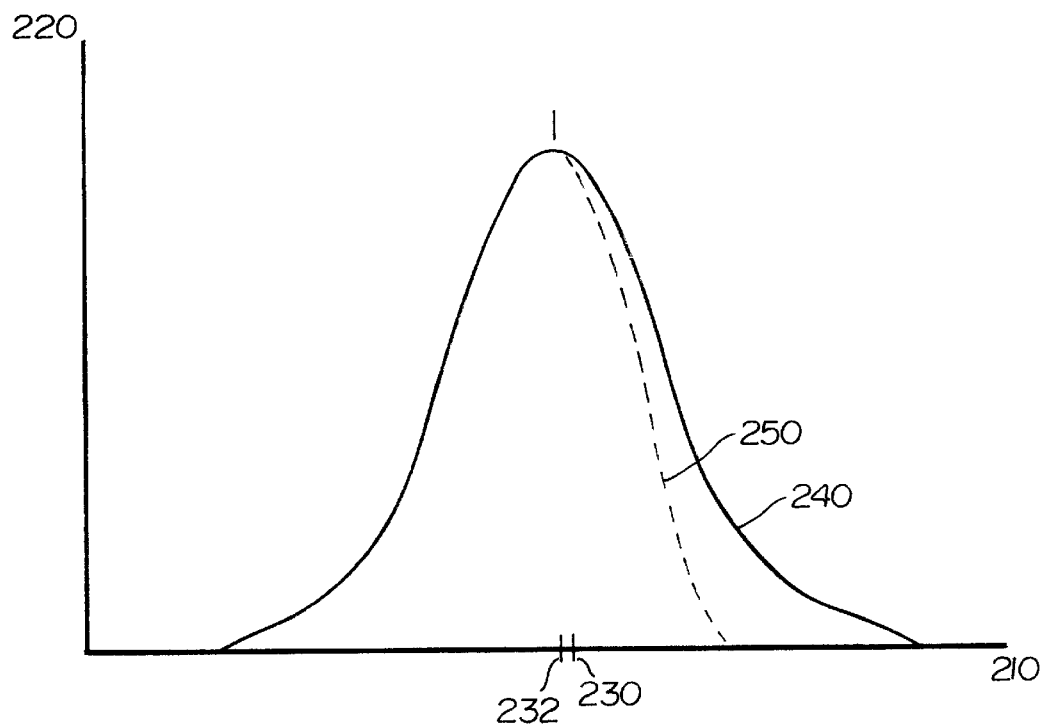
FIG. 2 is a graphical representation of the distribution of spacer member size about the nominal size for commercially available spacers.

FIG. 2 is a graphical representation showing a possible distribution of particle sizes in a typical commercially available powder, in which the size of the particles distributed around the nominal particle size 230 is plotted along the horizontal axis 210 and the population of the particles of the various sizes is plotted along the vertical axis 220 as the solid line 240. With reference to FIG. 2, commercially available powders contain particles that are not perfectly uniform in size, shape, or compressibility. Instead, the powders will comprise a distribution of particles 22 that are equal to (esg within about one percent of) the nominal size, particles 24 that are larger than the nominal particle size and particles 20 that are smaller than the nominal particle size. Typical commercial powders will have a three sigma distribution of particles equal to plus and minus 18% of the nominal size. As can be appreciated from the foregoing, as initially applied to the substrate, the quantity of spacer members 26 comprising particles 20, 22 and 24 will include a significant number of particles 24 that are significantly larger than the mean particle size 22. Since substrates 10 and 14 are, at least initially, substantially flat, the cell gap 30 of an assembled display device 11 will, at the outset, be larger than the nominal particle size 22. Additionally, since it is common for a liquid crystal display to have a slight negative pressure between substrates 10 and 14 the negative pressure will tend to bow one or more of substrates 10 and 14 inward between the oversized particles 24 and the more numerous particles 22 that are closer to the nominal particle size 230. This will result in a non-uniform cell gap 30 which, as discussed hereinbefore, will have deleterious on the contrast ratio and chromatic fidelity of the liquid crystal display cell.

It was recognized by the inventors of the present invention that because the principle force attracting the particles to the surface of the substrate is electrostatic, the weakest attraction would be between the largest particles in the substrate. (Van der Waals forces falloff with the sixth power of the particle size.) Accordingly, it was perceived that any kind of perturbation, be it ultrasound, mechanical agitation, fluid flow or some other external energy source would preferentially remove the larger particles, which have the largest area, the largest mass and the weakest electrostatic attraction to the substrate. Accordingly, as shown by the line 250 of FIG. 2, subjecting the substrate to an external energy source would cause the distribution of spacer members larger than the nominal particle size to be narrowed such that the statistical variance of the particles above the nominal particle size would be reduced. As shown in FIG. 2 the preferential removal of the larger particles will cause a slight shift in the arithmetic mean of the distribution of particles from the point indicated as 230 (the nominal size) to the point indicated as 232. More importantly, as illustrated by the dashed line 250 of FIG. 2, the preferential removal of larger particles results in a lower population of particles that are larger than the nominal size 230 (reduction of the statistical variance) with the largest particles completely absent from the population.

Figure 3:
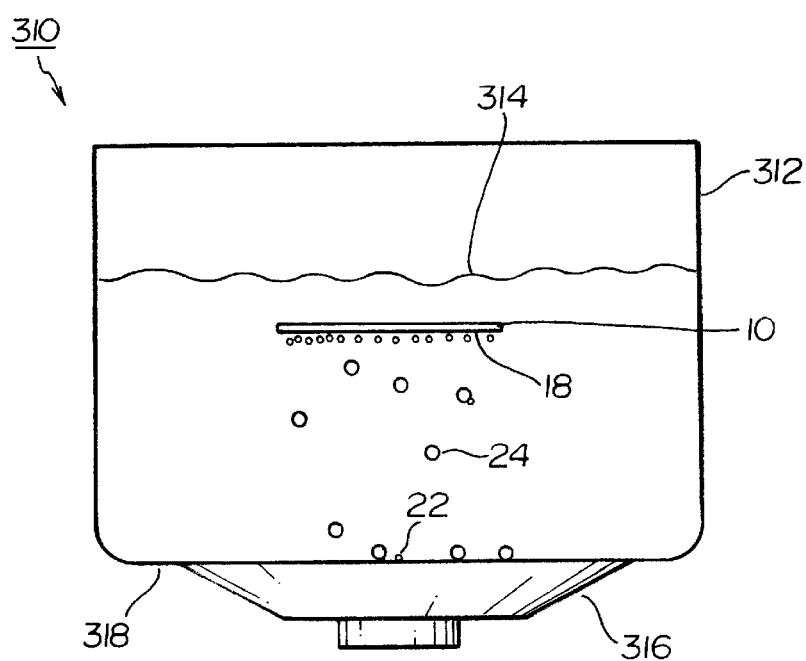
FIG. 3 is a cross-sectional view of an ultrasonic bath used to preferentially remove the larger spacer members from a substrate in accordance with the present invention.

FIG. 3 is a schematic cross-sectional view of an ultrasonic bath used from a substrate according to an exemplary process for preferentially removing the larger particles from a substrate 10. The exemplary process is carried out in an ultrasonic bath 310 comprising a container 312 that is partially filled with a liquid solvent 314 such as methanol. The container is agitated by an ultrasonic horn 316 attached to the exterior surface 318 of container 312. Substrate 10 is immersed in solvent 314 and the container 312 agitated by ultrasonic horn 316. In an exemplary process, a substrate 10 was dusted with a powder containing spherical particles having a nominal 3.7 micron diameter. Substrate 10 was subsequently immersed in solvent 314 and subjected to ultrasonic energy at 60 kilowatts at 30 kilohertz for a period of approximately 5 minutes. Upon removal from the solvent bath, it was observed that approximately 50% of the particles had been removed from the substrate. Cell gap uniformity of a liquid crystal cell using the commercially available 3.7 micron nominal diameter particles was improved by the exemplary process from plus or minus 5% to plus or minus 2% of the nominal cell gap, a better than 50% improvement in the cell gap tolerance. A similar exemplary process was conducted in which a substrate was dusted with a powder containing 1.1 micron nominal diameter spherical particles. The second substrate was subjected to the same energy and frequency for the same duration. However, it was observed that no significant number of the 1.1. micron spherical particles were removed.

As shown in FIG. 3, the preferential orientation of substrate 10 in the ultrasonic bath is with top surface 18 facing downward. This increases the probability that a large particle 24 being removed will not bump into and dislodge a nominal sized particle 22, although some inadvertent dislodging of nominal sized particles is unavoidable. Nevertheless, since the mechanical agitation or other external energy source inherently preferentially dislodges the larger particles even if some nominal sized particles are removed the overall effect will be to remove a group of particles from the surface, the majority of which are larger than the nominal sized particle, thereby reducing the overall standard deviation of the distribution of particles on the surface and, more importantly, narrowing variance of particle sizes above the nominal as evidenced by the improvement in the cell gap uniformity.

Although certain preferred embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. A method of assembling a light influencing display device comprising:
   providing a first substrate, said first substrate comprising a major surface having disposed thereon a first plurality of display electrodes;
   depositing a plurality of spacer members on said first substrate, said plurality of spacer members comprising a distribution of particles having a mean particle size and a plurality of smaller and larger particles relative to the mean particle size;

subjecting said substrate to an external energy source to preferentially remove a group of said plurality of particles, the majority of particles in said removed group being larger than the mean particle size;

attaching a second substrate having a major surface to said first substrate such that the major surface of said second substrate faces the major surface of said first substrate and said major surface of said first substrate cooperates with said major surface of said second substrate to contact and retain at least some of said plurality of spacer members therebetween, said at least some of said plurality of spacer members supporting said major surface of said first substrate and said major surface of said second substrate in a spaced apart configuration with a uniform gap therebetween; and injecting a light influencing fluid material into said gap.

2. The method of claim 1, wherein:
said plurality of spacer members is deposited on said first substrate by dusting.

3. The method of claim 1, wherein:
said plurality of spacer members is deposited on said first substrate by spinning.

4. The method of claim 1, wherein:
said plurality of particles is held to said first substrate by electrostatic attraction.

5. The method of claim 4, further comprising:
cleaning said major surface of said first substrate with a surfactant, the surfactant acting to decrease the electrostatic attraction between said first substrate and said plurality of spacer members.

6. The method of claim 1, wherein:
said plurality of particles is held to said first substrate by steric forces.

7. The method of claim 1, wherein:
said plurality of particles is held to said first substrate by a electrostatic attraction and steric forces.

8. The method of claim 1, wherein:
said external energy source is ultrasound.

9. The method of claim 8, wherein:
the step of subjecting said substrate to an external energy source is carried out with said first substrate in an inverted orientation.

10. The method of claim 1, wherein:
the step of subjecting said substrate to an external energy source comprises immersing said first substrate in an ultrasonic bath in an inverted orientation such that the major surface of said first substrate and said plurality of particles are facing downward.

11. A liquid crystal display comprising:
a first substrate, said first substrate comprising a major surface having disposed thereon a first plurality of display electrodes;

a plurality of spacer members on said first substrate, said plurality of spacer members comprising a distribution of particles having a mean particle size and a plurality of smaller and larger particles relative to the mean particle sizes, wherein said substrate is subjected to an external energy source to preferentially remove a group of said plurality of particles, the majority of particles in said removed group being larger than the mean particle size;

a second substrate having a major surface to said first substrate such that the major surface of said first substrate faces the major surface of said second substrate and said major surface of said first substrate cooperates with said major surface of said second substrate to contact and retain at least some of said plurality of spacer members therebetween, said at least some of said plurality of spacer members supporting said major surface of said first substrate and said major surface of said second substrate in a spaced apart configuration with a uniform gap therebetween; and a light influencing fluid material in said gap.

12. The liquid crystal display of claim 11, wherein:
said plurality of spacer members is deposited on said first substrate by dusting.

13. The liquid crystal display of claim 11, wherein:
said plurality of spacer members is deposited on said first substrate by spinning.

14. The liquid crystal display of claim 11, wherein:
said plurality of particles is held to said first substrate by electrostatic attraction.

15. The liquid crystal display of claim 11, wherein:
said plurality of particles is held to said first substrate by steric forces.

16. The liquid crystal display of claim 11, wherein:
said plurality of particles is held to said first substrate by a electrostatic attraction and steric forces.

17. The liquid crystal display of claim 11, wherein:
said major surface of said first substrate is cleaned with a surfactant, the surfactant acting to decrease the electrostatic attraction between said first substrate and said plurality of spacer members.

18. The liquid crystal display of claim 11, wherein:
said external energy source is ultrasound.

19. The liquid crystal display of claim 11, wherein:
said first substrate is immersed in an ultrasonic bath in an inverted orientation such that the major surface of said first substrate and said plurality of particles are facing downward.

20. A light valve cell comprising:
a first substrate comprising a major surface having disposed thereon a first plurality of display electrodes;

a plurality of spacer members disposed on said first substrate, said plurality of spacer members comprising a group consisting of a plurality of particles having a nominal particle size and a plurality of larger and smaller particles relative to said nominal particle size, said group of particles comprising a non-gaussian distribution having a standard deviation above said nominal particle size that is less than the standard deviation below the nominal particle size;

a second substrate having a major surface, said major surface having at least one display electrode disposed thereon, said second substrate being attached to said first substrate such that the major surface of said first substrate and the major surface of said second substrate contact and retain at least some of said plurality of spacer members therebetween, said at least some of said plurality of spacer members supporting said major surface of said first substrate away from said major surface of said second substrate in a spaced apart configuration with a uniform gap therebetween; and a liquid crystal material disposed in said gap.

* * * * *